United States Patent Office 2,716,100
Patented Aug. 23, 1955

2,716,100

RESINOUS, LINEAR POLYMERIC CHLORO-ALKANEPHOSPHONATES

Harry W. Coover, Jr., and Marvin A. McCall, Kingsport, Tenn., assignors to Eastman Kodak Company, Rochester, N. Y., a corporation of New Jersey No Drawing. Application September 10, 1952,
Serial No. 308,928

10 Claims. (Cl. 260—61)

This invention relates to resinous, linear polymeric chloroalkanephosphonates, and to a process for their preparation.

We have made the important discovery that monochloroalkanephosphonic acid dichlorides can be condensed with certain dihydroxy aromatic compounds with the liberation of hydrogen chloride to give high molecular weight linear polymers, and that the original chloroalkane groups remain unchanged in the condensation reaction so that such polymers contain a chloroalkane (chloroalkyl) group attached to each phosphorus atom. Accordingly, the polymers of the invention and various shaped objects prepared therefrom by molding, extrusion, etc. are characterized by unusually high degree of flame resistance.

It is, accordingly, an object of the invention to provide a new class of resinous, linear polymeric chloroalkanephosphonates. Another object is to provide a process for preparing the same. Other objects will become apparent hereinafter.

In accordance with our invention, we prepare our new class of condensation polyphosphonates linearly recurring structural unit:

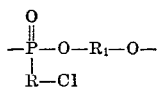

wherein R is a saturated divalent alkylene group containing from 1 to 12 carbon atoms and $R_1$ is an aromatic nucleus such as a benzene nucleus, a diphenyl nucleus, a diphenyl sulfone nucleus and a naphthalene nucleus, etc., by heating a mixture comprising approximately equimolar quantities of a dihydroxy aromatic compound and a chloroalkanephosphonyl dichloride having the general formula:

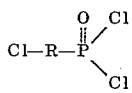

wherein R has the above definition, at a temperature of from 90°–400° C., preferably from 150° to 260° C., in the presence of an alkaline-earth halide condensation catalyst (e. g. calcium chloride, zinc chloride, etc., but especially anhydrous magnesium chloride) until the condensation reaction is substantially complete. The amount of catalyst can vary from about 0.1 to 3.0 percent or even higher, based on the weight of the reactants. Mixtures of one or more of the dihydroxy aromatic compounds with one or more chloroalkanephosphonyl dichlorides can be employed. Advantageously, the reaction mixture is heated gradually with stirring to about 90°–100° C., the hydrogen chloride evolved being, if desired, swept out with a dry inert gas such as dry nitrogen, and then vacuum is applied gradually while the temperature is raised further until a final temperature of 250° C. or more is attained. This promotes completion of the reaction and ensures the rapid and substantially complete elimination of the hydrogen chloride evolved so that the products are obtained in relatively pure condition. Usually all of the quantities to be employed of the reactants and the catalyst are mixed together and the reaction performed as above described. However, good results are also obtainable by adding only part of the chloroalkanephosphonyl dichloride to the full amount of the dihydroxy aromatic compound and catalyst, and after the reaction has proceeded for some time at, for example, 90°–130° C., adding the remainder of the chloroalkanephosphonyl dichloride and continuing to heat with gradually increasing vacuum and temperature as above described, until the condensation reaction is substantially complete. In the process as described, the condensation takes place in the proportion of one mole of the dihydroxy aromatic compound to each mole of the chloroalkanephosphonyl dichloride.

Suitable dihydroxy aromatic compounds which can be employed in the practice of our invention include resorcinol, catechol, hydroquinone, dihydroxy toluenes, dihydroxy xylenes, dihydroxydiphenyls such as p, p'-dihydroxydiphenyl, dihydroxydiphenyl sulfones, etc. The monochloroalkanephosphonic acid dichlorides which are suitable in the practice of the invention include chloromethanephosphonyl dichloride, β-chloroethanephosphonyl dichloride, β-chloropropanephosphonyl dichloride, γ-chloropropanephosphonyl dichloride, ω-chlorobutanephosphonyl dichloride, ω-chlorododecanephosphonyl dichloride, and the like. Valuable polymeric materials are also obtainable by condensing the mentioned chloroalkanephosphonyl dichlorides and the mentioned dihydroxy aromatic compounds in the presence of alkanephosphonyl dichlorides such as methane-, ethane-, propanephosphonyl dichlorides or arylphosphonyl dichlorides such as benzenephosphnoyl dichloride.

The following examples will serve further to illustrate our new class of resinous, linear polymeric chloroalkanephosphonates, and the manner of their preparation.

Example 1

A mixture of 11.0 g. (0.1 mole) of hydroquinone, 17.1 g. (0.102 mole) of chloromethanephosphonyl dichloride and 0.1 g. of anhydrous magnesium chloride was stirred slowly while the temperature was gradually raised to 90° C. and maintained for one hour. Dry nitrogen was bubbled into the reaction mixture to help remove the hydrogen chloride which formed and to facilitate the stirring. After the first hour at atmospheric pressure and 90° C., vacuum was gradually applied and the pressure reduced so that the hydrogen chloride was removed more rapidly and completely, but care was taken not to distill out the low molecular weight material or unreacted chloromethanephosphonyl dichloride. Heating was also gradually increased with the increase in vacuum so that a pressure of 1–2 mm. and a temperature of 150° C. was attained after 2.5 hours. The temperature was then slowly increased to 250° C. over a 3 hour period. The product obtained, on cooling to normal conditions, was a very hard, tough, flameproof polymer which was linear in character and comprised the occurring structural unit:

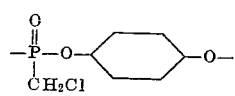

It was soluble in solvents such as dimethylformamide, methylene chloride, etc., and gave good quality shaped objects such as fibers, sheets, etc. by coating, extrusion and injection molding techniques.

In place of the hydroquinone in the above example, there can be substituted an equivalent amount of any other of the mentioned dihydroxy aromatic compounds (e. g. catechol, resorcinol, dihydroxy diphenyls, etc.), and in place of the chloromethanephosphonyl dichloride in the above example, there can be substituted an equivalent amount of any other of the mentioned chloroalkanephosphonyl dichlorides (e. g. β-chloroethanephosphonyl dichloride, γ-chloropropanephosphonyl dichloride, etc.) to give generally similar resinous, linear polyphosphonates.

*Example 2*

A mixture of 11.0 g. (0.1 mole) of hydroquinone, 8.55 g. (0.051 mole) of chloromethanephosphonyl dichloride and 0.1 g. of anhydrous magnesium chloride was stirred slowly while the temperature was gradually raised to 90° C. and maintained for one hour. Dry nitrogen was bubbled into the reaction mixture to help remove the hydrogen chloride which formed and to facilitate the stirring. After the first hour at atmospheric pressure and 90° C., vacuum was gradually applied and the pressure reduced slightly so as to remove the hydrogen chloride more rapidly and completely. Care was taken not to distill out any of the low molecular weight material or unreacted chloromethanephosphonyl dichloride. The temperature after 3 hours was approximately 120° C. At this point, more chloromethanephosphonyl dichloride (9.54 g. or 0.057 mole) was added and the process of gradually increasing the vacuum was repeated until a pressure of 1-2 mm. and a temperature of 250° C. was obtained, and the evolution of hydrogen chloride had stopped. The product obtained, on cooling to normal conditions, was a clear amber-colored, hard, flameproof polymer. It was essentially a linear polyphosphonate resin which was soluble in dimethylformamide and methylene chloride, but only slightly soluble in acetone.

*Example 3*

A mixture of 11.0 g. (0.1 mole) of hydroquinone, 4.27 g. (0.025 mole) of chloromethanephosphonyl dichloride, 5.53 g. (0.025 mole) of heptanephosphonyl dichloride and 0.1 g. of anhydrous magnesium chloride was stirred slowly while the temperature was gradually raised to 90° C. and maintained for one hour. Dry nitrogen was bubbled into the reaction mixture for removal of the hydrogen chloride which formed and to facilitate the stirring. Care was taken not to distill out any of the low molecular weight material or unreacted chloromethanephosphonyl dichloride. The temperature after 3 hours was 120° C. and at this point more chloromethanephosphonyl dichloride (8.55 g. or 0.051 mole) and more heptanephosphonyl dichloride (5.53 g. or 0.025 mole) were added. After the mixture had again become viscous, the pressure was gradually reduced so that the hydrogen chloride formed was more rapidly and completely removed. A pressure of 1-2 mm. and a temperature of 250° C. was finally obtained. After the evolution of hydrogen chloride had practically stopped (5 to 8 hours), the resultant product on cooling to normal conditions, was a clear amber-colored, tough, rubbery and flameproof material. It was essentially a linear polyphosphonate resin, which was soluble in solvents such as dimethyl formamide, dimethyl acetamide, methylene chloride, etc., and from which could be made various shaped objects such as fibers, films, sheets, and the like.

In place of hydroquinone in the above example, there can be substituted an equivalent amount of any other of the mentioned dihydroxy aromatic compounds (e. g. catechol, resorcinol, dihydroxy diphenyls, etc.) to give resinous, linear polyphosphonates having generally similar properties. Also, in place of the heptanephosphonyl dichloride in the above example, there can be substituted an equivalent amount of any other alkanephosphonyl dichloride such as ethanephosphonyl dichloride, butanephosphonyl dichloride, etc. The chloromethanephosphonyl dichloride can also be substituted in the above example with an equivalent amount of any other of the mentioned chloroalkanephosphonyl dichlorides to give generally similar resinous, linear polyphosphonates which are tough, rubbery and non-inflammable.

By proceeding as set forth in the preceding examples, other polymers of the invention with any of the mentioned dihydroxy aromatic compounds and any of the mentioned chloroalkanephosphonyl dichlorides can be prepared. In general, all the polymers of the invention are hard, tough materials at ordinary temperatures and have softening points in the range of 100°–150° C. These materials can be injection molded or extruded into such objects as fibers, etc., having remarkable properties. All of the polymers are characterized by being exceptionally non-inflammable. The high molecular weight polymers of the invention are not readily soluble in the common solvents. However, many of the polymers are soluble in such solvents as dimethyl formamide and dimethyl acetamide at room temperature. Compositions of the polymers for extrusion, molding or coating purposes may have incorporated therein, if desired, various other materials such as fillers, dyes, sizing materials, and the like. Mixtures of the various polymers of the invention can be employed for the above purposes.

What we claim is:

1. A resinous, linear polymeric organo-phosphonate comprising the recurring structural unit

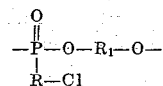

wherein R represents a saturated divalent alkylene group containing from 1 to 12 carbon atoms and $R_1$ represents an aromatic group selected from the group consisting of a phenylene group, a diphenylene group and a diphenylene sulfone group.

2. A resinous, linear polymeric organo-phosphonate comprising the recurring structural unit

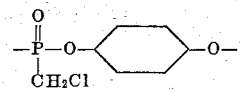

3. A resinous, linear polymeric organo-phosphonate comprising the recurring structural unit

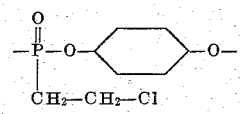

4. A resinous, linear polymeric organo-phosphonate comprising the recurring structural unit

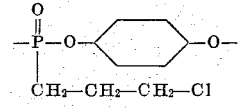

5. A resinous, linear polymeric organo-phosphonate comprising the recurring structural unit

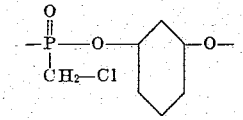

6. A process for preparing resinous, linear polymeric organo-phosphonates comprising the recurring structural unit

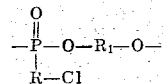

wherein R represents a saturated divalent alkylene group containing from 1 to 12 carbon atoms and $R_1$ represents an aromatic group selected from the group consisting of a phenylene group, a diphenylene group and a diphenylene sulfone group, which comprises heating in the presence of anhydrous magnesium chloride a mixture comprising approximately equimolar quantities of a dihydroxy aromatic compound selected from the group consisting of a dihydroxybenzene, a dihydroxy diphenyl and a dihydroxydiphenyl sulfone, and a chloroalkane phosphonyl dichloride containing from 1 to 12 carbon atoms, at a temperature of from 90° to 400° C., until the condensation reaction is substantially complete.

7. A process for preparing a resinous, linear polymeric organo-phosphonate comprising the recurring structural unit

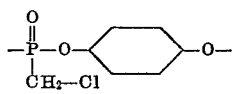

which comprises heating in the presence of anhydrous magnesium chloride a mixture comprising approximately equimolar quantities of hydroquinone and chloromethanephosphonyl dichloride, at a temperature of from 150° to 260° C., until the condensation reaction is substantially complete.

8. A process for preparing a resinous, linear polymeric organo-phosphonate comprising the recurring structural unit

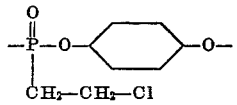

which comprises heating in the presence of anhydrous magnesium chloride a mixture comprising approximately equimolar quantities of hydroquinone and β-chloroethanephosphonyl dichloride, at a temperature of from 150° to 260° C., until the condensation reaction is substantially complete.

9. A process for preparing a resinous, linear polymeric organo-phosphonate comprising the recurring structural unit

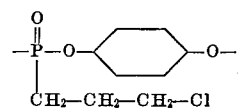

which comprises heating in the presence of anhydrous magnesium chloride a mixture comprising approximately equimolar quantities of hydroquinone and γ-chloropropanephosphonyl dichloride, at a temperature of from 150° to 260° C., until the condensation reaction is substantially complete.

10. A process for preparing a resinous, linear polymeric organo-phosphonate comprising the recurring structural unit

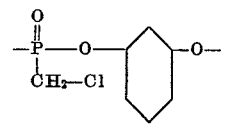

which comprises heating in the presence of anhydrous magnesium chloride a mixture comprising approximately equimolar quantities of resorcinol and chloromethanephosphonyl dichloride, at a temperature of from 150° to 260° C., until the condensation reaction is substantially complete.

References Cited in the file of this patent

UNITED STATES PATENTS

| 2,435,252 | Toy | Feb. 3, 1948 |

FOREIGN PATENTS

| 644,468 | Great Britain | Oct. 11, 1950 |
| 282,638 | Switzerland | Sept. 1, 1952 |